United States Patent [19]

Lassiter

[11] 3,956,980

[45] May 18, 1976

[54] METHOD FOR PROCESSING REFUSE MATERIAL

[76] Inventor: Rush E. Lassiter, 1722 W. Thomas, Hammond, La. 70401

[22] Filed: Oct. 2, 1973

[21] Appl. No.: 402,823

Related U.S. Application Data

[63] Continuation of Ser. No. 213,378, Dec. 29, 1971, abandoned.

[52] U.S. Cl. .............................................. 100/38
[51] Int. Cl.² .................... B30B 15/34; B30B 13/00
[58] Field of Search .............................. 100/95–98, 100/37, 39, 38, 112, 116, 218, DIG. 5, 93 P, 94; 34/12, 14, 60; 23/259.1, 259.3; 241/23, 24

[56] References Cited
UNITED STATES PATENTS

| | | | |
|---|---|---|---|
| 2,977,214 | 3/1961 | McLellan | 23/259.1 |
| 3,272,116 | 9/1966 | White et al. | 100/112 |
| 3,357,380 | 12/1967 | Siracusa | 100/97 |
| 3,383,228 | 5/1968 | Rekate et al. | 100/93 P |
| 3,477,649 | 11/1969 | Dalberg et al. | 241/24 |
| 3,478,192 | 11/1969 | Fink | 100/93 P UX |
| 3,589,276 | 6/1971 | Swallert | 100/97 |
| 3,651,755 | 3/1972 | Gati | 100/96 |
| 3,721,183 | 3/1973 | Dunlea, Jr. | 100/39 |

Primary Examiner—Peter Feldman
Attorney, Agent, or Firm—Arnold, White & Durkee

[57] ABSTRACT

A method for processing refuse material including comminuting metal free raw refuse and placing the comminuted refuse between heated platens, forcing the platens together to compress and dry the refuse, and scraping the adhering dried and compressed refuse from the surfaces of the platens, comminuting it and placing it in containers. The apparatus for carrying out the process of the present invention includes a conveyor belt to convey the refuse to a grinder that comminutes the raw refuse, a hopper receives the comminuted raw refuse from the grinder and supplies it to feed screws feeding the raw comminuted refuse onto heated metal platens that compress and dry the refuse. A scraper is provided for removing the adhered refuse from the platens, and a second hopper is disposed to receive the refuse scraped from the heated metal platens and to deposit it into a second grinder where it is comminuted into a small platelet-like flakes for final disposition in containers.

17 Claims, 7 Drawing Figures

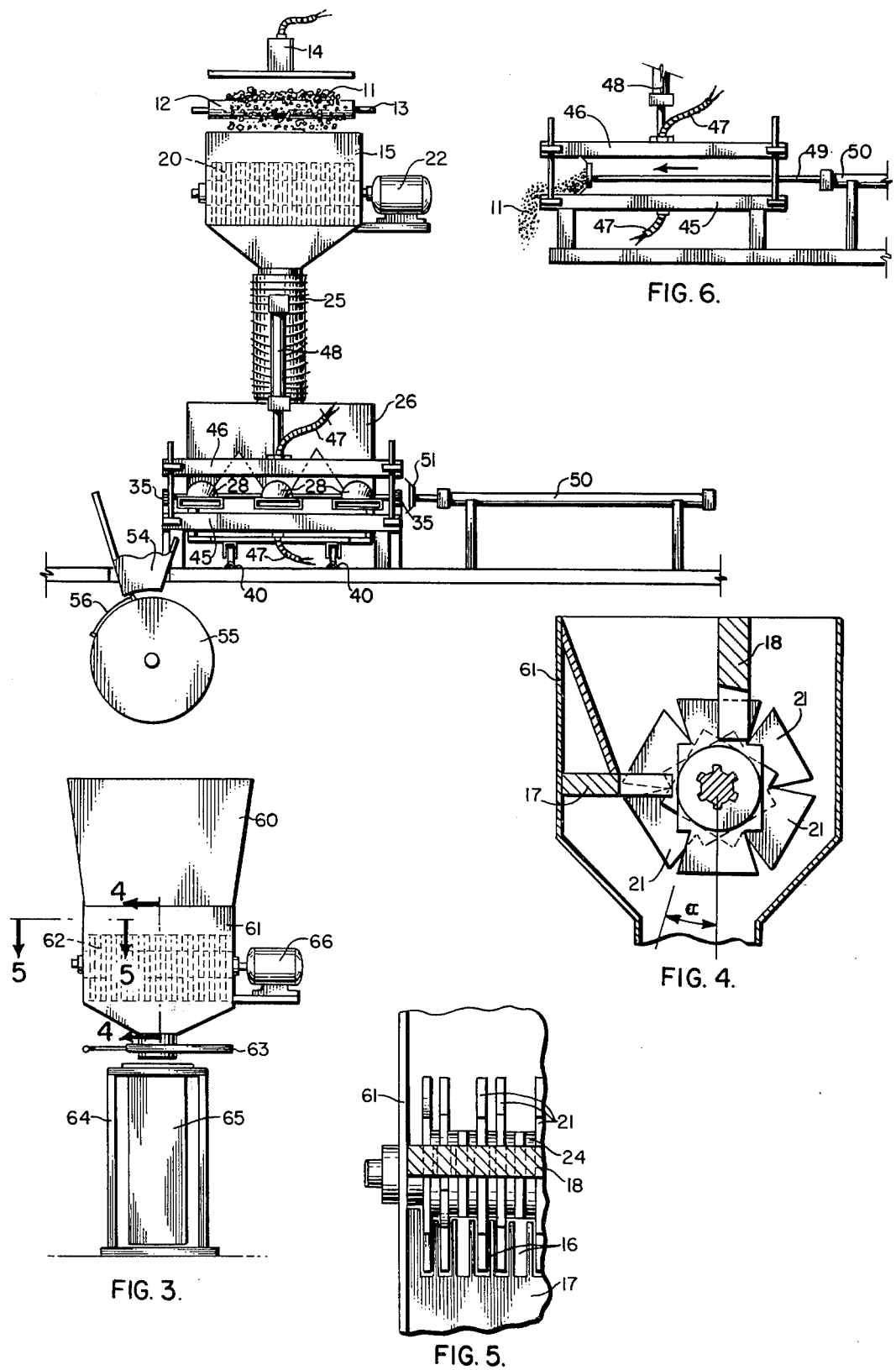

METHOD FOR PROCESSING REFUSE MATERIAL

This is a continuation of application Ser. No. 213,378, filed Dec. 29, 1971, now abandoned.

BACKGROUND OF THE INVENTION

This invention relates to an improved process for comminuting and drying various types of garbage and refuse. More particularly, the invention relates to an improved process for comminuting, heating, compressing and drying nutrient containing wastes such as food wastes produced by dining establishments, sewage matter, animal wastes such as occurs where animals such as cattle and hogs are kept for commercial meat production, etc., to produce a bacteria free, dried product that may be used as animal feed fertilizer or the like. It is to be understood that the words refuse, garbage and wastes, as used herein, include all types of nutrient containing material as well as other material that is intended to be disposed of in a clean and dried form.

U.S. Pat. No. 1,101,129, issued June 23, 1914, U.S. Pat. No. 1,493,335, issued May 6, 1924, and U.S. Pat. No. 2,089,978, issued Aug. 17, 1937, disclose various processes and apparatus for treating and handling material such as refuse. U.S. Pat. No. 1,493,335 discloses a process whereby refuse is dried by pressing the refuse between a roller and the surface of a heated plate, thereby accomplishing heating and disintegration simultaneously. U.S. Pat. No. 1,101,129 teaches drying refuse by heating the refuse in an oven. U.S. Pat. No. 2,089,978 teaches drying the refuse by passing it on a conveyor through an oven.

Refuse discarded from dining establishments contains a high degree of nutrients since such refuse is primarily composed of food waste. Such refuse is typically discarded by burning it or dumping the refuse in a refuse dump where it may be covered with earth or left uncovered as desired. No benefit is usually realized from the various nutrients contained in the refuse and the costs of handling the refuse is considered a serious burden on society.

Where animals, such as cattle, hogs and the like are kept in a closely confined area, typically referred to as a feed lot for the purpose of commercial meat production, the animal wastes become a serious problem because the wastes cannot be effectively disposed of in ordinary sewage treatment plants. It is the typical practice in the industry to allow the feed lots to accumulate the animal wastes for long periods of time and to periodically remove such wastes with scraping machines. The result of such handling requires the animals to live in an unsanitary environment where diseases can develop that render the animals unfit for commercial production. Moreover, the animal wastes typically cause an odor problem that has the effect of contaminating large areas of the environment.

Where pesticides are employed to kill bacteria carrying insects such as flies to prevent the development of diseases, the pesticide materials themselves create a problem of contaminating the ground water about feed lots which ground water, in due course, finds its way into the streams and rivers and causes water pollution. It is desirable to eliminate the need for using large amounts of pesticide materials in commercial meat production.

In hospitals it is frequently desirable to dispose of diseased wastes and materials. The problem of handling and adequately disposing of hospital wastes is typically exceedingly expensive because of the necessity to prevent spreading of human diseases. It is necessary that the wastes be subjected to heat for a sufficient amount of time to dispose of any bacteria contained therein and to render the wastes free from rapid water absorption in order to prevent bacteria from forming in the processed waste material within a reasonable amount of time following processing of the same.

It is therefore a primary object of the present invention to provide a novel method for processing refuse and waste materials having a nutrient content in such manner that the waste materials may be employed as animal feed and may be disposed of in an inexpensive and sanitary manner.

It is a further object of the present invention or provide novel method for processing refuse in such manner that the processed refuse may be stored for long periods of time without becoming contaminated by bacteria.

It is also an important object of the present invention to provide novel method for processing sewage wastes to remove the water content thereof and to yield a solid, compressed and dried product that may be efficiently utilized as commercial fertilizer or may be efficiently and inexpensively disposed of without causing pollution of the environment.

It is an even further object of the present invention to provide a novel method for processing refuse materials where there is yielded a flake or platelet-like product that does not have an affinity for absorption of water from the atmosphere.

It is an object of the present invention to provide a method for grinding and drying refuse.

It is another object of the present invention to provide a method for grinding and drying food waste.

It is still another object of the present invention to provide a process for producing fertilizer and animal food from disposed food.

SUMMARY OF THE INVENTION

The present invention provides a process for processing various forms of refuse such as disposed food refuse and for processing the refuse into a compressed flake-like comminuted material that may be used for fertilizer or for animal or poultry feed or may be disposed of in a sanitary manner. The apparatus utilized in processing the refuse may include apparatus for transporting wastes such as unprocessed or raw refuse to the processing apparatus and comminuting the same to render it suitable for subsequent drying. Apparatus is also utilized to convey the comminuted raw refuse from the grinding apparatus to an upper and lower heated platen assembly and to deposit it in relatively thin layer form on the lower heated platen. The heated platens are then moved together, compressing and causing heating of the refuse layer. The pressure created by the platens on the refuse layer may be varied during the heating and compression process if desired or it may be continuously varied during the heating process depending upon the character of the refuse being processed or upon the results intended. After the refuse layer or layers have been heated sufficiently to kill the bacteria in the refuse suitably dried, the platens are moved apart and the layer or sheet of dried refuse is removed from between the platens in any suitable manner. The dried and heat treated refuse then is comminuted into a flake-like or platelet form and placed into containers for ultimate disposal.

BRIEF DESCRIPTION OF THE DRAWINGS

So that the manner in which the above recited features, advantages and objects of the invention, as well as others, which will become apparent, are attained and can be understood in detail, more particular description of the invention, briefly summarized above, may be had by reference to the embodiments thereof which are illustrated in the appended drawings, which drawings form a part of this specification.

It is to be noted, however, that the appended drawings illustrate only a typical embodiment of the invention and are therefore not to be considered limiting of its scope, for the invention may admit to their equally effective embodiments.

IN THE DRAWINGS

Figures 1, 2:
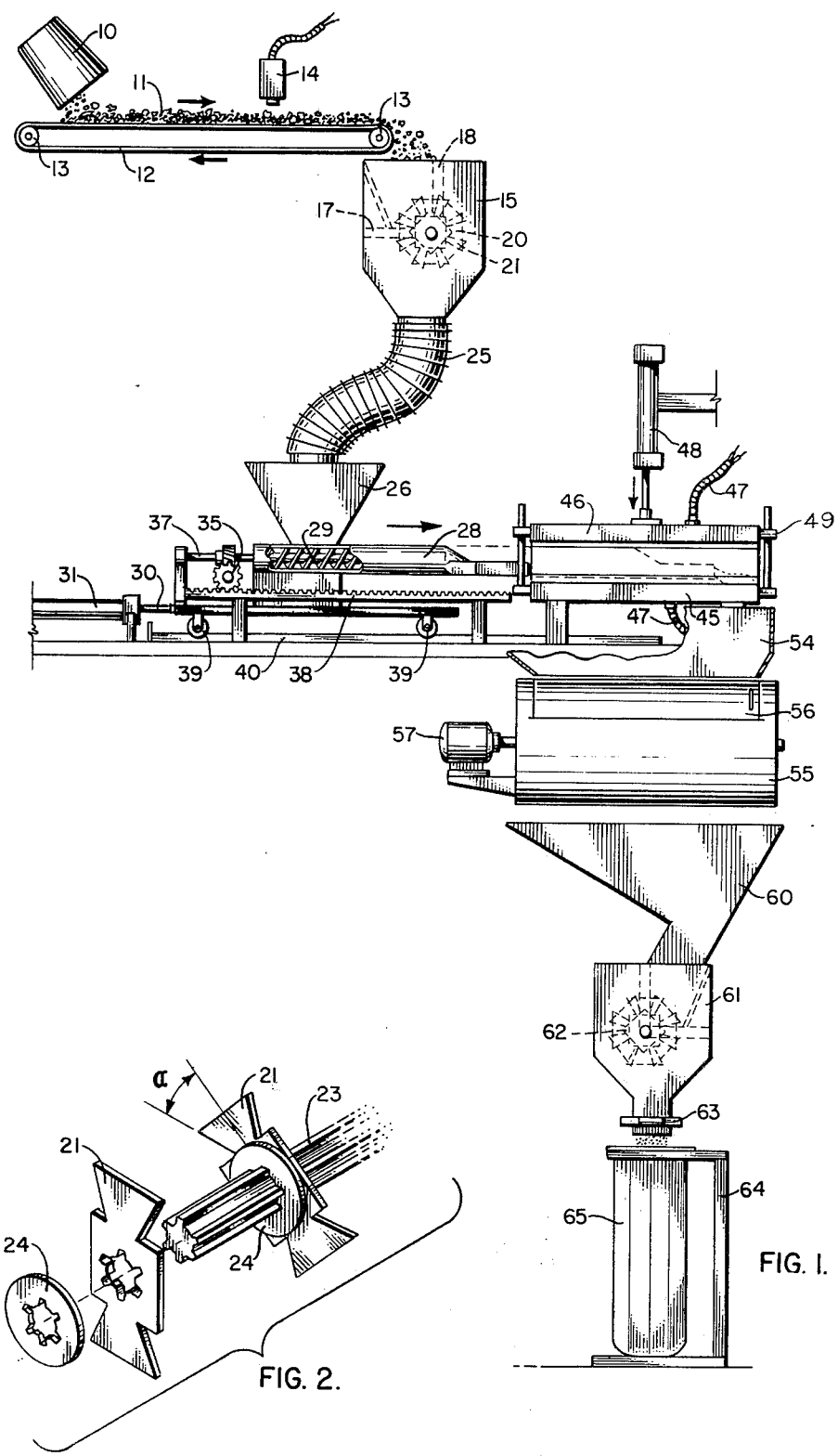

FIG. 1 is a side elevational view of the refuse processing system of the present invention.

FIG. 2 is an exploded perspective view of grinding blades utilized in the grinding apparatus.

FIG. 3 is a front elevational view of the refuse processing system of the present invention.

FIG. 4 is a fragmentary sectional view of FIG. 3 taken along lines 4—4.

FIG. 5 is a fragmentary sectional view of FIG. 3 taken along lines 5—5.

FIG. 6 is a fragmentary elevational view of the scraper structure of FIG. 1 showing the operation of the refuse scraper.

Figure 7:
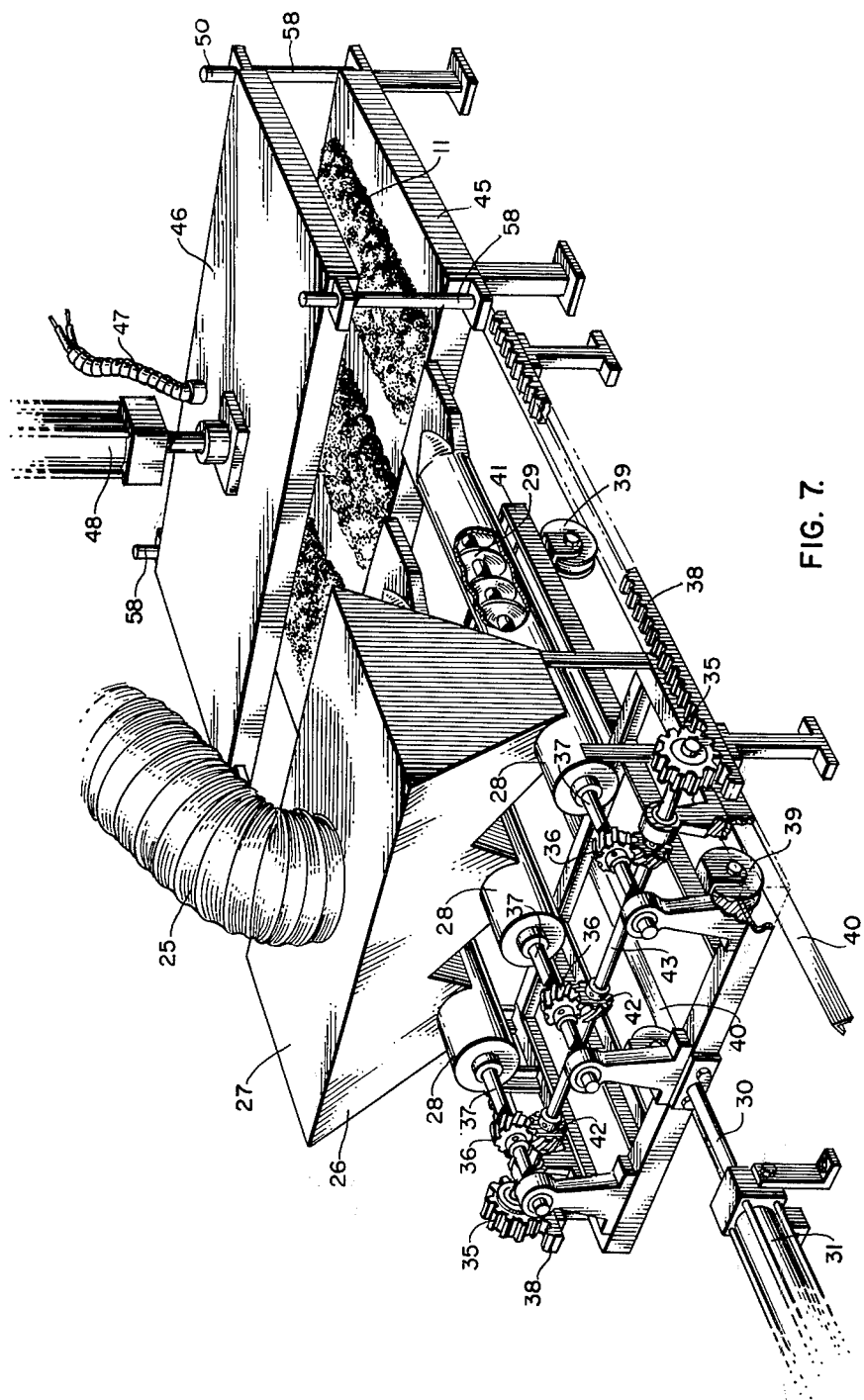

FIG. 7 is a perspective view of the apparatus for feeding refuse to the heated metal plates and having part thereof broken away and illustrating the raw refuse feed mechanism in detail.

DESCRIPTION OF PREFERRED EMBODIMENTS

Referring now to the drawings, in FIG. 1 is shown refuse container 10 which holds the raw refuse to be processed. The raw refuse may be classified residual food product refuse from which harmful non-food product refuse has been removed by a classification process. Container 10 may be a hopper or any other mechanism that provides raw refuse at an optimum quantity rate for efficient comminution. The raw refuse 11, before classification, is poured from container 10 onto endless conveyor belt 12 which revolves on rollers 13. The raw refuse travels along conveyor belt 12 beneath a metal scanner 14 which detects any ferrous or non-ferrous metal in the refuse and either stops conveyor belt 12 by actuating an electrical relay or by any other conventional means or actuates appropriate removal apparatus for removing the harmful metal object. The metal thus detected may be removed manually in the case of non-ferrous metal or by a magnet device if ferrous metal is detected. Any other metal removal mechanism may be employed within the spirit and scope of the present invention. Metal scanner 14 can be any conventional metal-scanning device known in the art such as those used in airports to detect metal objects that might be carried by airline passengers boarding an aircraft. Glass or non-ferrous objects may also be removed from the refuse material in any conventional manner.

The raw refuse 11 is dumped from conveyor belt 12 into an upper hopper 15 between anvil 17 and anvil 18 where it is contacted by an upper grinder 20.

Food waste type refuse frequently contains small quantities of non-food material such as various plastic wrapping materials, paper, wood, glass, string, bone and the like. Grinding mechanisms capable of properly grinding most food wastes are incapable of properly comminuting such non-food materials. The grinding mechanism of the present invention is particularly designed to achieve proper grinding or comminuting of both food wastes and most non-metal material that is of non-food characteristic.

It is very important that upper grinder 20 be capable of grinding the raw refuse into fine particles for rapid drying. Upper grinder 20 may be any conventional grinder well known in the art that is suitable for comminuting both food waste and the non-food materials ordinarily accumulated with food wastes. It is preferred, however, that a grinder such as shown in FIG. 2 be employed having a series of blades 21 mounted on a splined shaft 23 and spaced apart by spacers 24.

Upper grinder 20 and lower grinder 62, shown in FIGS. 1 and 2, may be identical. FIG. 5 shows a partly sectional view of grinder 62 in which blades 21 can be seen to rotate within slots 16 in cutting anvil 17. Anvil 18, as seen in FIG. 4, is similar in design to anvil 17 and has slots (not shown) for receiving blades 21. The blades 21 are preferably two trapezoids spaced 180° apart, as can be seen in FIG. 2. The angle $\alpha$ of the sides of the trapezoidal blade may vary from about 0° to about 90°. Preferably the angle varies from about 30° to about 60° to achieve optimum comminution of both food waste and non-food waste material of the character described above. The angle between the center lines of each successive blade may vary from about 20° to about 90°, or more preferably from about 45° to about 90°. An angle of 60° is most preferred.

The grinder may be driven by an electric motor 22, as indicated in FIG. 3. After passing through the grinder the refuse decends through the bottom of top hopper 15 and into flexible conduit 25 and is conducted by the conduit into hopper 26. As can be seen in FIG. 7, the flexible conduit 25 is attached to the top 27 of hopper 26 which prevents excess refuse from overflowing the hopper.

The refuse falls downward into feed tubes 28, as seen in FIG. 7, and onto feed screws 29 contained in feed tubes. The feed tubes 28 are supported by a rolling table 41 having wheels 39 that are received by a track 40. Movement of the reciprocating table 41 along track 40 is controlled by a piston rod 30 connected to a piston located in cylinder 31. Cylinder 31 may be any conventional hydraulic or pneumatic cylinder well known in the art.

Feed screws 29 have shafts 37 extending from feed tubes 28 upon which a bevel gear 36 is mounted. Bevel gear 36 contacts bevel gear 42 which is aligned perpendicularly thereto. At each end of shaft 43 is disposed a pinion gear 35 which engages rack 38. A one-way clutch (not shown) connects gear 35 to shaft 43. The one-way clutch allows shaft 43 to turn only when table 41 is moving away from lower heating plate 45. Such clutches are well known in the art and any conventional one-way clutch may be used. Therefore, feed screws 29 turn only when table 41 is moving away from plate 45.

To deposit refuse on the lower heating plate 45, rod 30 forces table 41 forward toward the lower heating platen 45, as indicated in FIG. 1. After table 41 is fully driven toward lower heating platen 45, as indicated by the dotted lines in FIG. 1, rod 30 begins to retract and gear 35 begins to turn in a counter-clockwise direction. The one-way clutch connecting gear 35 to drive shaft 43 is actuated and therefore shaft 43 is also rotated counterclockwise to drive feed screws 41. As feed screws 41 turn, comminuted refuse is forced out of feed tubes 28 onto hot plate 45 in broad layers of relatively even thickness. The consistency of the comminuted refuse material may vary from a relatively thick slurry form to a heavy paste-like consistency. Comminuted refuse 11 is shown deposited on lower heating platen 45 in FIG. 7.

After table 41 has been fully withdrawn and a full charge of refuse 11 has been deposited on lower heating platen 45, upper heating platen 46 is moved downward into contact with refuse 11 by piston 48 which may be identical to piston rod 30 and serves to flatten or spread the refuse to a sheet-like form in the order of 0.01 inches in thickness. Upper heating platen 46 is guided down by guides 50. Conduits 47, shown in FIGS. 3 and 7, attached to upper heating platen 46 and lower heating platen 45 contain electrical wiring for electrically heating the platens. The pressure on the refuse held between the two heating platens can be regulated by regulating the force applied to the piston rod 48 by the piston.

Depending upon the results intended, the heated platens may be brought into contact with the layer of comminuted refuse and a specific pressure may be maintained upon the refuse during the heating and drying cycle. If desired, the platens may exert light or heavy pressure upon the comminuted refuse during the initial phase of the heating and drying process and the pressure may be increased or reduced in steps during other phases of the drying process. It may be appropriate to continuously vary the mechanical pressure applied by the platens to the refuse layer during the heating and drying process if such renders the product more acceptable for the intended use or if the refuse may be dried in a shorter period of time by employing such variations.

After the two heating platens have been in contact with the refuse for a period of time sufficient to dry the layer of comminuted refuse, the upper heating platen may be withdrawn by rod 48. A scraper 51, as shown in FIG. 6, may then be forced across lower heating platen 45 to scrape the dry, compressed garbage 11 from the lower heating platen. Scraper 51 is any conventional plate or scraper which will contact lower heating platen 45 and upper heating platen 46 when forced between the platens to remove dried refuse material that may adhere to one or both of the platens 45 and 46. The scraper 51 is actuated by piston rod 49 which may be identical to rod 30. Platens 45 and 46 preferably have tapered edges (not shown) located on the side facing scraper 51 to enable scraper 51 to slide easily between the platens.

The dried sheet of refuse material 11 scraped from heating platens 45 and 46 falls into upper refuse chute 54 and then gravitates from chute 54 into a rotatable receiving bin 55 through receiving bin opening 56. The dried and compressed sheet of refuse material breaks into large compressed flakes which may be from ½ inch to several inches in diameter upon being scraped from the platens. Receiving bin 55 may be rotated by an electric motor 57 to deposit the refuse material into lower chute 60. Lower chute 60 guides the large flakes of refuse into lower hopper 61 which may be substantially identical in design to upper hopper 15 and contains a grinder that may, if desired, be substantially identical to upper grinder 20. The grinder 20 breaks the large flakes of compressed and dried refuse into smaller flakes in the order of one quarter inch or less that can be efficiently handled by pouring. This material may be referred to as pulverant material.

After the dried refuse is ground it gravitates through the grinder onto closing device or valve 63. The refuse may be further cooled, dried, and aerated by circulating drying air through the pulverant material. It is important to achieve further drying of the material before it loses the heat applied during initial compression and drying to achieve efficient drying. Motor 66 may if desired be a combination motor and blower and may transport drying air into the grinding chamber to achieve final drying. Closing device 63 may consist of a flat plate or gate which can be moved laterally to open and close the bottom of hopper 61, or may conveniently take the form of any other conventional hopper closing device. When the bottom of hopper 61 is opened, the processed refuse falls into bag 65 held by bag stand 64. The bag may then be sealed and removed from the bag filling apparatus for transportation to a suitable storage facility.

In practicing the process of the present invention it is important that the temperature of lower heating plate 45 and upper heating plate 46 be maintained at a temperature that is high enough to drive off the moisture content of the refuse material and to kill most of the bacteria that might be present in the material and which is not high enough to cause destruction of the nutrient content of the material. It has been determined that a temperature range from about 212°F to about 900°F is appropriate to properly process the refuse material. Upper platen 46 should be forced against the refuse for a time period from about 20 seconds to about 3 minutes, or more preferably from about 1 to about 3 minutes depending on the nature of the material. Preferably, the heating platens are maintained at a temperature of from about 300°F to about 600°F, or more preferably from about 400°F to about 550°F. The mechanical pressure applied on the refuse by the heating platens 45 and 46 ranges from about 20 to about 1000 pounds per square foot.

The mechanical pressure on the refuse material may be applied by lowering upper platen 46 at a continuous rate, or, in the alternative, the upper platen 46 may be lowered in stages. Preferably, upper platen 46 is lowered until it touches the refuse and exerts only sufficient pressure thereon on to spread the refuse material to a thin layer and is left in this position for a few seconds. Then upper platen 46 then may be lowered until a pressure of 20 pounds per square foot is achieved and left in this position for a short period of time. Further increases in pressure may be made as desired to yield a properly compressed product of flake-like nature which will not readily absorb moisture from the atmosphere.

In all of the following examples the upper and lower heating platens were maintained at a temperature of about 300°F, the mechanical pressure on the refuse was about 550 psi, and the total amount of time the refuse was held between the two heating platens was about 1 minute.

The processed refuse was analyzed with the following results:

| Sample Processed Refuse | pH | % Moisture | % Ash | % Ca | % P | % N | % K |
|---|---|---|---|---|---|---|---|
| 1 - Dark | 5.7 | 7.25 | 7.44 | 0.37 | 0.20 | 1.42 | 0.13 |
| 2 - Medium | 5.5 | 7.74 | 7.20 | 0.37 | 0.22 | 1.53 | 0.13 |
| 3 - Light | 4.9 | 8.51 | 4.31 | 0.25 | 0.23 | 2.22 | 0.21 |

As can be seen from the foregoing examples, the processed refuse is high in various mineral content which makes it suitable for use as a fertilizer or as animal and poultry feed.

The foregoing is considered as illustrative only of the principles of the invention. Further, since numerous modifications or changes will readily occur to those skilled in the art, it is not desired to limit the invention to the exact construction and operation shown and described, and accordingly all suitable modifications and equivalents may be resorted to, falling within the scope of the invention as claimed.

What is claimed is:

1. A method for processing raw refuse material having a water content into a compressed, dried flake-like form having high nutrient content that will not readily absorb moisture from the atmosphere, said method comprising:

placing the raw refuse material between a pair of heated platens, said platens being disposed in movable relation one with the other;

forcing said platens together to compress said refuse material to a thin wafer-like form and maintaining said refuse material under compression for a predetermined period of time to heat and dry said refuse material the heat of said platens being sufficiently high to substantially destroy all of the bacteria contained within said refuse material while allowing said refuse material to retain substantially all of the nutrient content thereof;

moving said platens apart; and removing the compressed and dried refuse material from said platens.

2. The method of claim 1 wherein said raw refuse material is comminuted into a slurry-like form before the refuse material is placed between said platens.

3. The method of claim 2 wherein the platens are heated to a temperature of from about 212°F to about 900°F.

4. The method of claim 3 wherein the platens are forced against the refuse material for a period of about 20 seconds to about 3 minutes.

5. The method of claim 1 wherein the refuse material compressed between the platens is subjected to mechanical pressure ranging from about 20 pounds per square foot to about 1000 pounds per square foot.

6. The method of claim 5 wherein the pressure is applied by slowly lowering the upper platen at a continuous rate until the mechanical pressure reaches about 1000 pounds per foot.

7. The method of claim 5 wherein the upper platen is lowered toward said lower platen in stages.

8. A method for compressing and drying raw refuse material having a water content into a product of compacted and wafer-like form, which product is resistant to absorption of moisture from the atmosphere, has high nutrient content and may be stored in bacteria free manner for extended periods of time, said method comprising:

comminuting said raw refuse material into a thick slurry-like form;

conducting said comminuted refuse material slurry to a pair of heated platens, at least one of said platens being movable relative to the other of said platens;

moving at least one of said platens to a position where at least part of one of said platens is spaced from the other of said platens;

placing said comminuted raw refuse slurry on the lowermost one of said platens;

moving at least one of said platens toward the other of said platens and causing distribution of said slurry into a thin wafer-like form between said platens, at least one of said platens being maintained at a temperature above 212°F under atmospheric pressure;

moving at least a portion of said platens apart; and removing the compressed and dried wafer-like refuse material from between said platens.

9. The method of claim 8 wherein said refuse material is scraped from said platens.

10. The method of claim 8 wherein said refuse material between said platens is subjected to a mechanical compression in the range of from about 20 pounds per square foot to about 1000 pounds per square foot.

11. The method of claim 10 wherein said platens are forced against said refuse material for a period of about 20 seconds to about 3 minutes.

12. The method of claim 11 wherein said pressure is applied by moving said platens toward one another at a continuous rate until said pressure reaches about 1000 pounds per square foot.

13. The method of claim 12 wherein said platens are moved toward one another in stages.

14. The method of claim 8 including the step of:

comminuting said dried and compressed refuse material immediately following removal of the same from between said platens.

15. The method of claim 13 including the step of:

cooling said dried and compressed refuse material following removal of said refuse material from between said platens; and areating said refuse material during cooling by blowing air through the same.

16. The method of claim 8 including the step of:

classifying said refuse material prior to comminution of the same to remove harmful matter from said refuse material.

17. The method of claim 8 including the step of:

placing said dried and compressed refuse material within container means following removal of said compressed and dried refuse material.

* * * * *